No. 616,619. Patented Dec. 27, 1898.
W. JAMES.
VELOCIPEDE.
(Application filed Apr. 1, 1898.)
(No Model.)
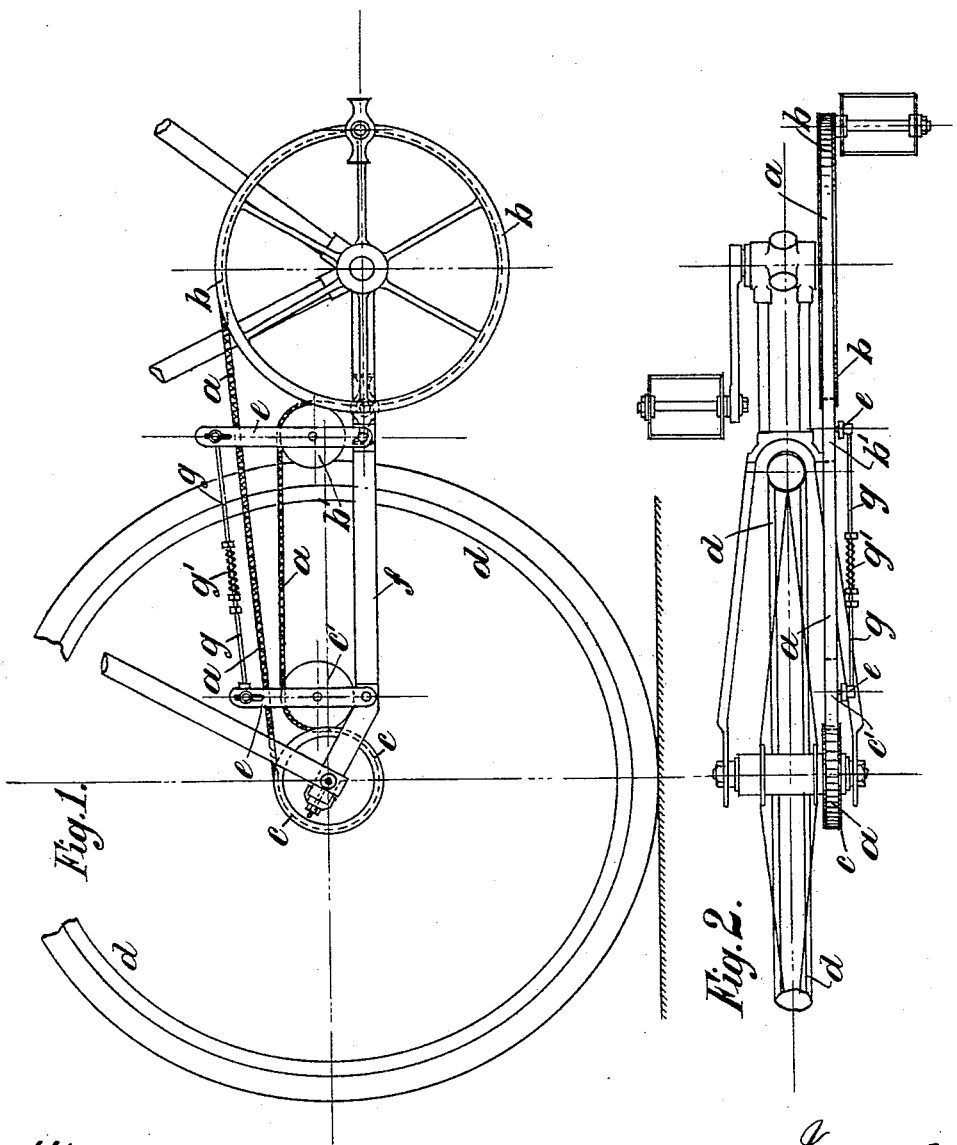

UNITED STATES PATENT OFFICE.

WILLIAM JAMES, OF BIRKENHEAD, ENGLAND, ASSIGNOR TO DAVID ALEXANDER McNEIGHT, OF LIVERPOOL, ENGLAND.

VELOCIPEDE.

SPECIFICATION forming part of Letters Patent No. 616,619, dated December 27, 1898.

Application filed April 1, 1898. Serial No. 676,120. (No model.)

*To all whom it may concern:*

Be it known that I, WILLIAM JAMES, a subject of the Queen of Great Britain, and a resident of Birkenhead, in the county of Chester, England, have invented certain new and useful Improvements in Driving Mechanism for Bicycles and the Like, of which the following is a specification.

The invention the subject of this application has reference mainly to the driving-gear of velocipedes, primarily bicycles, (but also to motor cycles or velocipedes or cars,) and particularly to that type of such driving-gears in which the motion is transmitted from one part (say from the pedal-driven crank of a velocipede) to the driven part (say the hub of the rear road-wheel) by a flexible and substantially stretchless band working over a pulley on the driving part and a pulley on the driven part; and it has chiefly for its object to provide a gear of this kind in which while the transmission of power and movement shall be complete and effective without slip it shall be effected with very little friction on the journals or bearings carrying the revolving wheels or working parts and at the same time to provide a gear of this character which is not liable to diminution of efficiency, deterioration, or damage and is compact and neat.

According to this invention the transmission belt or band is brought and kept in contact with the greater part of the peripheries or rims of the wheels over which it works, so as to obtain a "wrapping-around" effect of the band with the wheel, and this is effected by the employment, in connection with each of the main gear-pulleys, of a secondary or "jockey" pulley, over which the band passes as it comes off the driving-pulley and as it passes onto the driven pulley, and which gently presses the band onto these wheels, say by an adjustable spring-support or by a fixed adjustment. By these means when the drive wheel or pulley is revolved by the pedals the band is caused to grip onto the wheel and to thereby make such contact therewith that it will not slip and will positively revolve such wheels and without stretching the belt and introducing abnormal friction on its bearings.

The band driving-gear, according to this invention, is illustrated in elevation in Figure 1 and in plan in Fig. 2, showing it applied to an ordinary bicycle, in which the rear road-wheel is driven.

The invention will be described by the aid of the drawings.

In the drawings, $a$ designates the transmission-belt, which may be assumed to be of any suitable flexible and stretchless material, as textile fabric or a highly-flexible metallic band.

$b$ is the driving-wheel, fixed on and revolving with the crank-shaft, and $c$ is the driven wheel, fixed on the hub of the rear road-wheel $d$.

According to this invention the belt is carried around and kept in contact with the greater part of the periphery of the wheels over which it works—namely, the driving and driven wheels $b$ and $c$—so as to obtain a wrapping-around effect of the band with the wheels. This is effected by the employment, in connection with these wheels $b$ and $c$, of secondary wheels $b'$ and $c'$, and it is preferred that the portion of belt between the driving and driven wheels which is under tension—namely, the part running from the upper side of $c$ onto the upper part of $b$—should be straight. In this case the belt passing over $b$ is carried around it up onto the back side, where it passes over the secondary pulley $b'$, and is thus wrapped around the greater part of $b$. Then at the wheel $c$ the belt is led onto this wheel at a point near where the other side of the belt leaves it and is so wrapped around this pulley also the greater part of its periphery.

The pulleys $b'$ and $c'$ are mounted on levers $e$, having their fulcra on the tube $f$ of the frame of the cycle, while at their upper ends these levers are provided with rods $g$, which are adjustable in the ends of $e$ and have an adjustable spring $g'$ upon them, adapted to press the two parts of this rod and the levers $e$ away from each other. By this the pulleys $b'$ $c'$ will be gently pressed toward and onto the peripheries of the wheels $b$ and $c$, the degree of pressure varying according to the tension under which the spring is adjusted. Thus the belt $a$ is normally and constantly pressed onto $b$ as it comes off this wheel and pressed onto $c$ as it goes onto this wheel. By these means when the drive-wheel $b$ is revolved by the pedals tension is put upon the band and causes it to grip onto the wheels $b$ and $c$ and to make such a contact with them that it will not slip, but will positively revolve such wheels, and with little friction.

It is of great importance that a firm and positive grip between the belt $a$ and the driven wheel $c$ should be obtained, and by the belt being led onto the wheel $c$ at about the point shown, and pressed gently onto it at this point, and carried around the greater part of the periphery, as described, this is thoroughly accomplished. As, in the case shown, the driving-wheel $b$ has a larger periphery, the amount of grip between the band and wheel, in this case, is more easily obtained than in the case of the driven wheel by virtue of the actual contact-surface, and in this wheel it is not always necessary under all circumstances that the wheel $b'$ should actually press the band onto $b$, although it should be very near; but it is preferred even in this case to have the belt gently pressed on. The pressure exerted by the wheels $b'$ and $c'$ on the belt, pressing it onto their respective wheels $b$ and $c$, can be a variable one by varying the point of connection of the rods $g$ in the levers $e$.

The arrangement of the main parts shown in the figures is advantageous and convenient; but the invention is not restricted to it, and in applying it under different conditions and to vehicles of the kind referred to or to meet special cases it will be varied necessarily to suit those conditions—as, for instance, in applying it to autocycles or autocar driving-gears and the like.

What is claimed in respect of the herein-described invention is—

In a bicycle, the combination with the driving and driven wheels $b$ and $c$, of an endless driving-band $a$ passing over them, levers pivoted to the frame in proximity to each of the said driving and driven wheels, an idle-pulley journaled on each lever in proximity to the driven wheel at a level as high as the center of said wheel by which the belt is wrapped around the greater portion of the periphery of such driven wheel and pressed upon said wheel, said driving-band passing over both of said pulleys, and a spring acting on each of the levers and pressing said driven-wheel pulley onto the driven wheel, and tending to press the driving-wheel pulley toward the driving-wheel, substantially as described.

In witness whereof I have hereunto set my hand in presence of two witnesses.

WILLIAM JAMES.

Witnesses:
ERNEST R. ROYSTON,
JOHN H. WALKER.